United States Patent [19]

Beauchede et al.

[11] 3,996,465
[45] Dec. 7, 1976

[54] TEST RIG FOR SUBJECTING SPECIMENS TO HIGH TEMPERATURE BEHAVIOR TESTS

[75] Inventors: Jacques Beauchede, L'Etang-la-Ville; Paul Breant, Asnieres, both of France

[73] Assignee: Commissariat a l'Energie Atomique, Paris, France

[22] Filed: Oct. 30, 1975

[21] Appl. No.: 627,449

[30] Foreign Application Priority Data

Nov. 7, 1974 France .............................. 74.36987

[52] U.S. Cl. .............................. 250/304; 176/19 R
[51] Int. Cl.² ........................................ G21C 17/00
[58] Field of Search .......... 250/304, 390, 391, 392; 176/10, 17, 19 R

[56] References Cited
UNITED STATES PATENTS

| | | | |
|---|---|---|---|
| 3,723,732 | 3/1973 | Larson et al. ...................... | 250/392 |
| 3,932,211 | 1/1976 | Loving, Jr. ........................ | 176/19 R |
| 3,940,618 | 2/1976 | Donguy ............................ | 250/304 |

*Primary Examiner*—Archie R. Borchelt
*Attorney, Agent, or Firm*—Sughrue, Rothwell, Mion, Zinn & Macpeak

[57] ABSTRACT

A rig for high-temperature testing of specimens subjected to gamma radiation in a nuclear reactor comprises two coaxial casings having cylindrical side walls. The inner casing which contains the specimen is supplied with an environment gas while the annular gap between the two casings is supplied with a gas having variable thermal conductivity. The casings have convex frusto-conical top and bottom walls joined together in pairs at a short and constant distance. The frusto-conical top wall of the outer casing is connected to its cylindrical side wall by means of a thermal expansion bellows seal.

10 Claims, 2 Drawing Figures

TEST RIG FOR SUBJECTING SPECIMENS TO HIGH TEMPERATURE BEHAVIOR TESTS

This invention relates to a test rig for subjecting specimens to high-temperature behavior tests in an intense gamma radiation, the complete test rig being intended to be maintained within the high neutron flux zone of a nuclear reactor channel. As a general rule, a high neutron flux produced in this manner is formed of thermal and fast neutrons having a value exceeding $10^{14}$ neutrons/cm$^2$sec.

Irradiation of fuel elements for high-temperature reactors has made it necessary to develop and perfect irradiation capsules of large diameter (at least equal to 60 mm) in order to carry out simultaneous tests on specimens, that is, on graphite blocks containing "compacts" annealed in situ or not, or on representative elements of blocks of real fuel. It is known that compacts are formed of fuel particles agglomerated in a graphite matrix provided with vertical cylindrical holes for the flow of a coolant gas (helium). Irradiation takes place in fast neutron fluxes having high values and consequently under conditions of high-intensity gamma flux. As a result of the gamma flux, the power generated within the structures themselves of the experimental device increases the temperature of said structures to levels which may prove unacceptable, taking into account the mechanical and thermal characteristics of the materials employed. The powers generated by the fuel (fission power) and by the structures (gamma power) are of very high value. Gamma heating is thus within the range of 10 to 16 W/g whilst the linear power of the capsule containing the graphite block at the level of this latter is within the range of 1400 to 1500 W/cm. Moreover, the obtainment of low temperatures within the structures is made difficult by the fact that the irradiations must take place within a double-walled enclosure for the following reasons:

safety with respect to the reactor environment so as to ensure that the fission products are separated from this environment by at least two sealed casings;

regulation of the temperature of the fuel block by means of a gas mixture which has adequate thermal conductivity and fills the space between the two casings aforesaid.

The aim of the invention is to provide an original assembly which makes it possible to obtain structure temperatures of low value and consequently to make use of ordinary materials for the structure.

To this end, the test rig in accordance with the invention is distinguished by the fact that the bottom and top walls of said casings are of convex frusto-conical shape, said frusto-conical walls being maintained in pairs at a short distance which is as constant as possible, and that the frusto-conical top wall of the outer casing is connected by means of thermal expansion bellows seal to the cylindrical side wall of the outer casing aforesaid.

As is readily apparent, the outer casing has a diameter such that the test rig can be introduced into the vertical channel of the reactor with sufficient clearance to ensure that the primary coolant fluid of the reactor is capable of flowing within said channel along the cylindrical wall of said casing. The pipe for the admission of the specimen environment gas is preferably placed inside the pipe for the admission of the gas which has variable conductivity (annular gap); the same applies to the pipes for the return of these gases.

The inner pipe and the outer pipe for admission or return ae preferably brazed simultaneously in vacuo at the point of penetration through the top walls of the inner casing and of the outer casing.

In an advantageous embodiment, wires having a diameter of a few hundredths of a millimeter are preferably spot-welded on the one hand to the frusto-conical bottom wall of the inner casing and on the other hand to the frusto-concial top wall of the inner casing, the frusto-conical bottom walls being rigidly fixed to each other for example by means of a few separate spot welds and the frusto-conical top walls being rigidily fixed to each other in the same manner. Said wires which perform the function of spacers between the top walls and also between the bottom walls are preferably placed radially and uniformly spaced around the circumference.

It is advantageous to fit thermal screens inside the inner casing within the frusto-conical space left free between at least one of its bottom and top walls and the adjacent transverse face of the specimen contained within said space.

Finally, in order to facilitate stacking of similar test rigs within any one reactor channel, the upper portion of the bellows seal preferably terminates in a concave frusto-conical wall which conforms to the shape of the test rig located immediately above ; at the lower end, the bellows seal can terminate in a frusto-conical wall which is approximately parallel to the top wall of the outer casing.

The frusto-conical top walls of the casings are traversed not only by the pipes aforementioned but also by the instrumentation (especially by thermocoupled for the measurement of temperatures within the inner casing and if necessary by neutron detectors and the like). In accordance with the preferred embodiment in which a number of similar rigs are stacked within the same vertical reactor channel, the pipes and the instrumentation can reach the top of said vertical reactor channel through the radial clearance space provided between the inner wall of the vertical channel and the outer casing of each rig (although naturally not including the lowermost rig of the stack).

The frusto-conical shape of the top and bottom walls not only makes it possible to fit thermal screens usually consisting of graphite strips separated by appreciable gaps but also serves in conjunction with the very small distance maintained by the centering wires and by virtue of the primary reactor coolant fluid or water to ensure effective cooling so as to ensure that the temperature on the frusto- conical walls of the inner casing never exceeds values which would be incompatible with the mechanical strength of ordinary materials (600°C, for example) although the temperatures at the center of the specimen can be expected to attain 1400°to 1500°C. As a result of the small clearance space between the top and bottom walls, this value can be maintained irrespective of the nature of the gas layer which fills the space between the two inner and outer casings : the type of gas can vary as a function of the environmental conditions to which the specimen is to be subjected during irradiation. As a result of the presence of the thermal screens, removal of heat takes place by conduction almost exclusively in the radial direction, the proportion of calorific power which is removed through the frusto-conical top and bottom walls being in the vicinity of only 1 to 2 %. Owing to the fact that the bottom wall of the inner casing is rigidly fixed to the bottom wall of the outer casing, that the same applies to the top walls of these two casings and that said walls are at appreciably different temperatures, it is necessary to arrange the rig in such a manner as to permit the possibility of differential expansion. It is with this object in mind that provision has been made in accordance with the invention for the insertion of a metallic bellows seal between the top and bottom walls of the outer casing by means of a radial displacement which prevents the bellows seal from disturbing the flow of coolant water within the reactor channel.

Each complete irradiation capsule comprising an inner casing and an outer casing can be reduced in length to dimensions of the order of 100 to 150 mm. Four or five identical capsules can therefore be readily superposed in any given reactor location. In each specimen, it is thus possible:

- to study the behavior of the fuel element by measuring the release of fission products and analyzing these latter (after withdrawal from the outlet pipe for the discharge of the specimen environment gas);
- to test the atmosphere of the specimen by measuring the purity of the gas by chromatography;
- to adjust the operating temperature either by maintaining this latter at a constant value or by cycling, that is, by adjusting the helium/nitorgen "gas layer" or by employing a helium/neon mixture as environment gas for the specimen;
- to take a continuous measurement of the thermal flux and therefore of the power;
- to measure at the end of irradiation the integrated fast flux by the counting of dose integrators (of the type consisting of copper under silica) which are placed in the proximity of each specimen.

The invention will now be set forth in greater detail with reference to the accompanying drawings which illustrate a preferred embodiment and in which.

Figure 1:
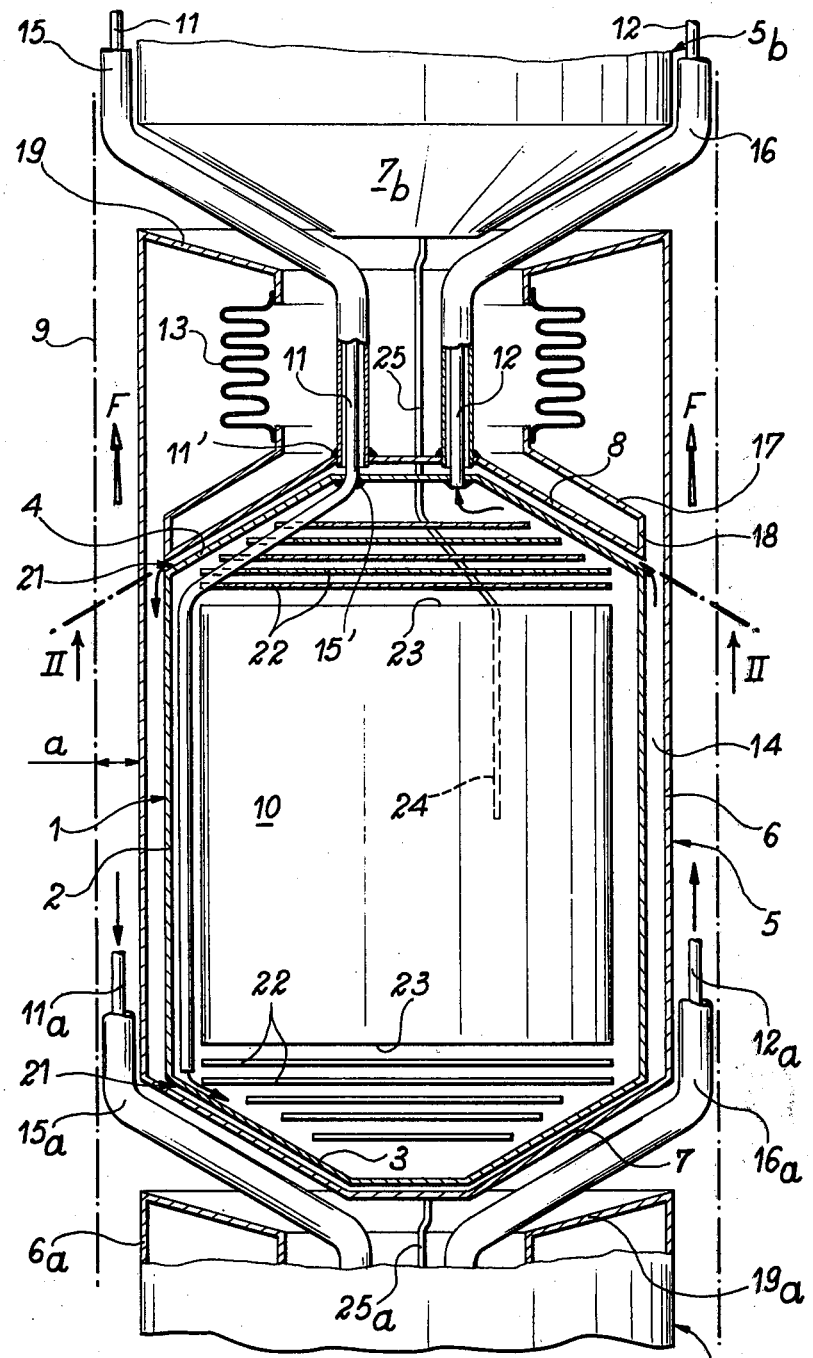
FIG. 1 is an axial sectional view of a test rig designed in accordance with the invention as well as a partial view of identical test rigs which are stacked together with the first.

The device in accordance with the invention comprises two coaxial casings, namely an inner casing 1 and an outer casing 5. The inner casing 1 is formed by a cylindrical side wall 2, a bottom wall 3 and a top wall 4 which are directly attached to each other. Similarly, the outer casing 5 comprises a cylindrical side wall 6, a bottom wall 7 which is directly attached to the side wall 6 and a top wall 8. As shown in FIG. 1, the top and bottom walls 3, 4, 7 and 8 have a convex frusto-conical shape and the bottom walls 3, 7 on the one hand and the top walls 4, 8 on the other hand are maintained at a short distance from each other. The outer casing 5 is arranged so that this latter can be introduced into one of the vertical channels 9 of a nuclear reactor with a radial clearance *a* which is sufficient to ensure that the primary coolant water of the reactor is capable of circulating within said channel (as shown by the arrows F) along the cylindrical wall 6 of said casing 5 (taking into account the additional bulk of the elements which are described hereinafter and which partly occupy said clearance-space). The inner casing 1 is adapted to receive the specimen 10 to be tested and to be connected to an admission pipe 11 and a return pipe 12 for an enviroment gas provided for the specimen 10. The top wall 8 of the outer casing 5 is connected by means of a thermal expansion bellows seal 13 to the cylindrical wall 6 of said casing 5, said cylindrical wall 6 being accordingly higher than the cylindrical wall 2 of the inner casing 1 as shown in FIG. 1. The annular gap 14 (or gas layer) which is limited by the inner casing 1 and the outer casing 5 together with its bellows seal 13 is intended to be connected to an inlet pipe 15 and a return pipe 16 for a second gas having variable thermal conductivity.

The bellows seal 13 has a cylindrical shape and is joined at one end to the top wall 8 by means of a frusto-conical wall 17 which is approximately parallel to said all 8 and by means of an element of cylindrical wall 18 and at the other end to the upper extremity of the cylindrical wall 6 by means of a concave frusto-conical wall 19, the concave shape of which more or less corresponds to the convex shape of the bottom wall 7 for the reasons which will be explained hereinafter.

The pipe 11 which serves to admit the environment gas for the specimen 10 is placed inside the inlet pipe 15 of the annular gap 14. The same applies to the pipes 12 and 16 for the return of these gases. In addition to the protective function performed by the outer pipes 15 and 16 in the event of leakage of the inner pipes, this construction makes it necessary to have only two leak-tight penetrations through the top wall 8 of the outer casing 5 (pipes 15 and 16) and two leak-tight penetrations through the top wall 4 of the inner casing 1 (pipes 11 and 12). These pipes can have very small diameters which have been enlarged in the figures for the sake of enhanced clarity of the drawings. It is readily apparent that these pipes pass within the interior of the bellows seal 13 without passing through the wall of this latter. In order to permit periodic renewal of the gas for the purpose of modifying the environment or in order to permit analysis of the fission products, it is preferable to ensure that the admission pipe 11 terminates at the bottom of the inner casing 1 and that the return pipe 12 extends from the top of said casing.

Wires 20 having a diameter of a few hundredths of a millimeter (for example 5/100 mm) are spot-welded on the one hand to the bottom wall 3 and on the other hand to the top wall 4. The bottom walls 3 and 7 are rigidly fixed to each other by means of a few separate spot welds (such as the weld 21); the same applies to the top walls 4 and 8. The wires 20 are only visible in FIG. 2 beneath the top wall 8 but are arranged between the bottom walls 3 and 7 in the same manner. In more exact terms, the wires are placed radially and in uniformly spaced relation on the circumference, for example with an angular spacing of the order of 10°

Figure 2:
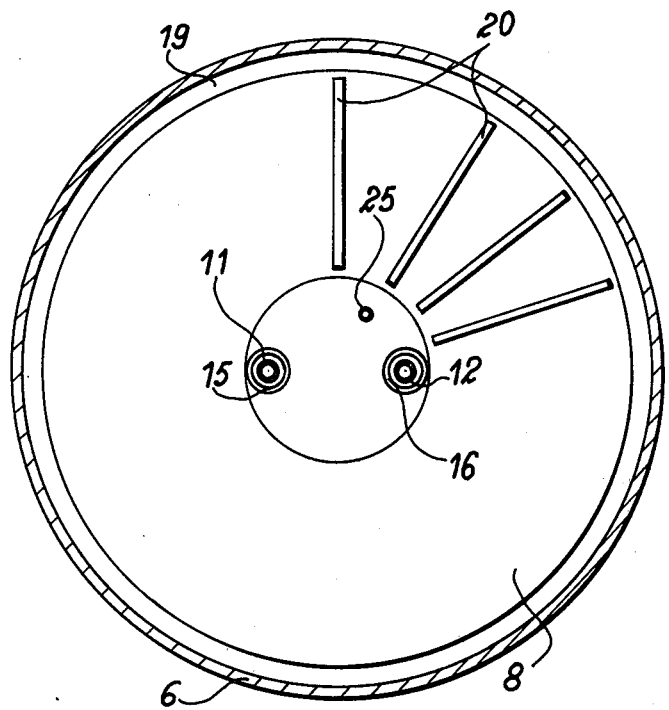
FIG. 2 is an approximately transverse sectional view taken along line II—II of FIG. 1.

The wires 20 which extend only over a portion of the top and bottom inner frusto-conical walls on which they are fixed leave free flow sectors which are sufficient to perit distribution of the gas layer under good conditions (as shown in FIG. 2).

The thermal screens 22 which are formed of graphite strips are fitted inside the inner casing 1 within the frusto-conical space which is left free between each frusto-conical wall 3 and 4 and the adjacent transverse face 23 of the specimen 10.

Suitable instrumentation is placed inside the inner casing 1 and the necessary connections to the out-of-pile instrumentation are passed through the channel 9 after penetrating through the top walls 4 and 8 in leak-tight manner. This instrumentation can comprise in particular thermocouples such as the thermocouple 24, the transmission cable of which is designated by the reference 25. The penetrations provided in the walls 4 and 8 for the tubes 11, 15 and 12, 16 as well as for the connections such as 25 are made leak-tight by brazing in vacuo. In particular, the two operations of brazing on the one hand of the tubes 11, 15 (fillets 11° and 15°) and on the other hand of the tubes 12, 16 to the top walls 4, 8 of each of the inner and outer walls 1 and 5 respectively are performed simultaneously. The upper screens 22 are preferably recessed in order to provide passageways for the pipes 11 and 12 and the cables such as 25.

By reason of the constructional design of the rig which permits in-pile residence under conditions of high gamma radiation and neutron flux, it is possible to stack in that portion of any one channel which is subjected to neutron flux as many test rigs as is permitted by the height of this useful portion while maintaining temperature conditions which are acceptable for these structures.

The same reference numerals are employed to designate the elements of the two rigs which are placed respectively beneath and above the rig which has just been described, said reference numerals being followed by the indices $a$ and $b$ respectively. It is seen that the concave shape of the frusto-conical wall 19 which forms the end portion of the bellows seal 13 is adapted to the convex shape of the frusto-conical wall 7b of the outer casing 5b which is superposed on this latter while allowing the concentric pipes 11, 15 and 12, 16 (and 11a, etc.) as well as the cables such as 25, 25a to pass externally of said casing 5b while taking up the minimum space in the vertical direction.

EXAMPLE

A test assembly comprises five stages which are identical with the one just described. Each stage offers a useful cylindrical volume 60 mm in diameter and 60 mm in height (namely a useful height of 300 mm in respect of an overall height ranging between 500 and 600 mm). The rig is provided with a specific water box 9 of AG3 NET alloy which, as explained earlier, delimits with the outer surface of the casings 5 a layer of coolant water and ensures protection for the pipes 11, 15 and 12, 16 and for the cables such as 25.

The casings 1 and 5 are of stainless steel and have the following dimensions:

inner casing 1 : diameter = 64.9 mm ; length = 66.9 mm outer casing 5 : diameter = 67.7 mm ; length = 69.5 mm.

Said casings delimit between their top and bottom walls a gas layer having a thickness of 0.05 mm and a conductivity which can assume all values between that of helium and that of nitrogen (the pipe 15 being connected to a source of He/$N_2$ mixture, the proportion of which can be varied). The bellows seal 13 is also formed of stainless steel.

The specimen 10 is inserted into the inner casing 1 prior to closure of this latter by welding of the top wall 4, whereupon the outer casing 5 together with its bellows seal 13 is placed around the inner casing 1. After irradiation, the casings 1 and 5 are cut-out in order to recover the specimen 10. this assembly has been successfully tested in a reactor during operation at power. In the different tests performed, it was established :

that it was possible to adjust the temperature of each stage, that cycling could be carried out in any selected stage, that there was not settling either of the He/Ne mixture within the interior or of the He/$n_2$ mixture within the gas layer, that the structures remained at an acceptable temperature, that samples could be taken from the gas without modifying the temperature, that no problem of differential expansion of the two casings arose.

The test rig accordingly makes it possible to carry out irradiations at high instantaneous flux values (fast neutrons, thermal neutrons and gamma rays) with an advantageous volume of specimens, differentiated batches and operating conditions adapted to each batch whilst the temperature of the specimens can be brought to or maintained at levels of the order of 1400° to 1500°C. The rig accordingly has a high degree of flexibility which enables it to satisfy a wide range of requirements while maintaining a high standard of reliability.

We claim:

1. A test rig for subjecting specimens to high temperature behavior tests under intense gamma radiation, the complete rig being intended to be maintained within the high neutron flux zone of a nuclear reactor channel, said rig being of the type comprising two coaxial casings having cylindrical side walls, the inner casing being adapted to receive said specimens and to be connected to an inlet pipe and a return pipe for a specimen environment gas, the annular gap limited by the two casings being intended to be connected to an inlet pipe and a return pipe for a gas having variable thermal conductivity, wherein the bottom and top walls of said casings are of convex frusto-conical shape, said frusto-conical walls being maintained together in pairs at a short distance which is as constant as possible, and wherein the top frusto-conical wall of the outer casing is connected by means of a thermal expansion bellows seal to the cylindrical side wall of said outer casing.

2. A test rig according to claim 1, wherein the pipe for the admission of the specimen environment gas is placed inside the pipe for the admission of gas having variable conductivity.

3. A test rig according to claim 1, wherein the pipe for the return of the specimen environment gas is placed inside the pipe for the return of the gas having variable conductivity.

4. A test rig according to claim 2, wherein the inner pipe and the outer pipe for admission or return are rigidly fixed by means of brazing fillets to the inner casing and outer casing at the points of penetration through the top walls of said casings.

5. A test rig according to claim 1, wherein wires having a diameter of a few hundredths of a millimeter are preferably spot-welded on the one hand to the frusto-conical bottom wall of the inner casing and on the other hand to the frusto-conical top wall of said inner casing and wherein the bottom walls on the one hand and the top walls on the other hand are rigidly fixed to each other.

6. A test rig according to claim 5, wherein the bottom walls on the one hand and the top walls on the other hand are rigidly fixed to each other by means of a few separate spot welds.

7. A test rig according to claim 5, wherein the wires are placed radially and uniformly spaced around the circumference.

8. A test rig according to claim 1, wherein thermal screens are fitted inside the inner casing within the frusto-conical space left free between at least one of its bottom and top walls and the adjacent transverse face of the specimen contained within said space.

9. A test rig according to claim 1, wherein the upper portion of the bellows seal terminates in a concave frusto-conical wall.

10. A test rig according to claim 1, wherein the lower portion of the bellows seal terminates in a frusto-conical wall which is approximately parallel to the top wall of the outer casing.

* * * * *